(12) United States Patent
York

(10) Patent No.: US 9,429,399 B2
(45) Date of Patent: Aug. 30, 2016

(54) PROJECTILE PRODUCING ELECTRICAL SHOCK

(71) Applicant: Andrew W. York, Portland, OR (US)

(72) Inventor: Andrew W. York, Portland, OR (US)

( * ) Notice: Subject to any disclaimer, the term of this patent is extended or adjusted under 35 U.S.C. 154(b) by 0 days.

(21) Appl. No.: 14/213,033

(22) Filed: Mar. 14, 2014

(65) Prior Publication Data

US 2014/0274500 A1  Sep. 18, 2014

Related U.S. Application Data

(60) Provisional application No. 61/801,589, filed on Mar. 15, 2013.

(51) Int. Cl.
| | |
|---|---|
| *F42B 6/08* | (2006.01) |
| *F42B 6/04* | (2006.01) |
| *A01K 79/02* | (2006.01) |
| *A01K 81/04* | (2006.01) |
| *F41H 13/00* | (2006.01) |
| *F42B 12/34* | (2006.01) |

(52) U.S. Cl.
CPC ............... *F42B 6/04* (2013.01); *A01K 79/02* (2013.01); *A01K 81/04* (2013.01); *F41H 13/0031* (2013.01); *F42B 6/08* (2013.01); *F42B 12/34* (2013.01)

(58) Field of Classification Search
CPC ........ A01K 79/02; A01K 81/04; F42B 6/02; F42B 6/04; F42B 6/08; F42B 12/362
See application file for complete search history.

(56) References Cited

U.S. PATENT DOCUMENTS

| | | | | |
|---|---|---|---|---|
| 2,805,067 A | * | 9/1957 | Ryan | F41B 13/10 200/61.49 |
| 3,771,249 A | * | 11/1973 | Johnson | A01K 81/00 43/6 |
| 4,667,431 A | * | 5/1987 | Mendicino | 43/6 |
| 4,951,952 A | * | 8/1990 | Saddler | F42B 12/362 473/570 |
| 5,141,229 A | * | 8/1992 | Roundy | H01H 35/14 200/61.53 |
| 5,732,501 A | * | 3/1998 | Ausburn | 43/5 |
| 2008/0242455 A1 | * | 10/2008 | Urbain | F41H 13/0031 473/583 |
| 2009/0111620 A1 | * | 4/2009 | Seales et al. | 473/570 |
| 2010/0101445 A1 | | 4/2010 | Garg | |

* cited by examiner

*Primary Examiner* — John Ricci
(74) *Attorney, Agent, or Firm* — Marger Johnson

(57) ABSTRACT

A projectile that includes a shocking function is presented. The projectile, such as an arrow, is structured to shock an animal as the arrow strikes its target. A capacitor may be used to store energy to generate the shock, or a shocking circuit may be self-contained. The shocking mechanism may be controlled by switch. In other embodiments electrically isolated electrodes could be present on the arrow, including the broadhead, that automatically cause the shocking system to discharge when the arrow has reached its target. The shocking function may be combined with a vibrating function for an even more lethal strike.

13 Claims, 6 Drawing Sheets

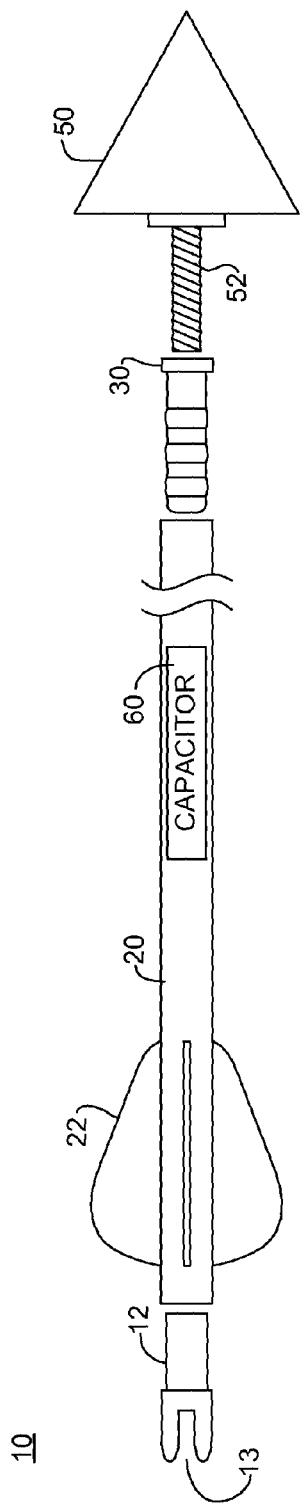
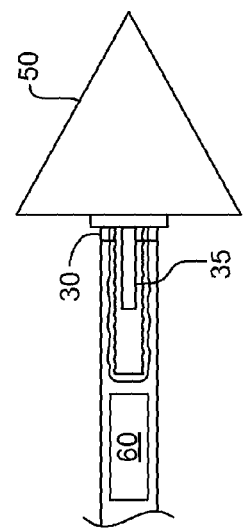
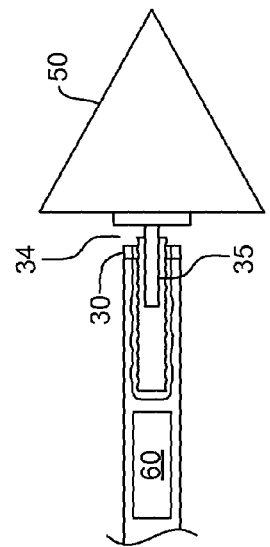
FIG. 1
FIG. 2A
Shock OFF
FIG. 2B
Shock ON

Broadhead in ON position

Broadhead in ON position

Broadhead in OFF position

Broadhead in OFF position

Broadhead in open position
and Shocking function ON

Broadhead in closed position
and Shocking function OFF

Broadhead with electrodes

PROJECTILE PRODUCING ELECTRICAL SHOCK

RELATED APPLICATION

This non-provisional application claims benefit of U.S. Provisional Application No. 61/801,589, filed Mar. 15, 2013, titled PROJECTILE PRODUCING ELECTRICAL SHOCK, which is incorporated by reference.

FIELD OF THE INVENTION

This disclosure is directed to projectiles, and, more particularly, to projectiles having a shocking feature.

BACKGROUND

Hunting is an ancient tradition that is still practiced for both survival and sport. In both cases the hunter's goal is to harvest the animal as humanely and quickly as possible.

While hunting using firearms is the most common form of hunting, especially when hunting big game such as elk and deer, hunting using a bow and arrow remains a popular activity. Bow hunters enjoy the increased challenge of hunting an animal using only mechanical means. In other words, it can be more physically challenging to harvest animals using a mechanically launched projectile, such as an arrow, than it is when using a firearm that accelerates its projectile as a result of a controlled explosion, often with the aid of ancillary sighting devices which can provide increase long range accuracy This difference, however, can pose a problem because it can be more difficult to bring down an animal as efficiently with an arrow as it is with a bullet.

The archery industry has strived to increase the killing force of the bow and arrow system with various improvements. For instance, bows were made with stronger pulling force, which resulted in the arrow being launched with higher velocity. The higher velocity translates to more damage done by the arrow, which results in quicker, more efficient harvesting of animals. When bows approached the limit of not being able to be effectively drawn and held by the archer, compound bows were developed that created additional mechanical force by using cams or lobed pulleys in conjunction with the bow and bowstring. Because of their let-off, these compound bows can have increased launching force and the ability to hold the bow at full draw for precision targeting with the use of a bow sight. Compound bows are now the most common bow used in hunting, especially big game hunting.

Arrows and especially arrowheads have also changed over time to increase the likelihood that the animal is quickly brought down. Broadheads have evolved from the stone heads of ancient times to the current broadheads made of metal. Generally broadheads have two to four fixed blades which may be finely sharpened to deeply penetrate the animal and cause massive internal bleeding. This minimizes the time between arrow penetration and animal expiration. Further, if the arrow does not kill quickly enough, the animal may travel significant distance after it is struck, increasing the likelihood that the animal may not be recovered, or that the animal unnecessarily suffers before dying.

Mechanical broadheads may also be used by hunters. Mechanical broadheads have two positions, a retracted position for flight and a second position that is deployed after the arrow strikes the animal. When the arrow strikes the animal, the broadhead switches from the flight position to the strike position, exposing its blades, which causes more damage to the animal than if the broadhead remained in the flight position. Mechanical broadheads generally penetrate the animal less deeply than fixed broadheads because some of the kinetic energy of the arrow is used to release the mechanical broadhead, although the increased damage to the animal that a mechanical broadhead causes may outweigh the kinetic energy loss, as they can have greater flight aerodynamics in the retracted position and a larger diameter cutting capability in the fully deployed open position upon impact with target Mechanical broadheads do not always work as intended, however. Depending on such variables as velocity, arrow weight, strike location, strike angle, etc., the mechanical broadheads may not fully deploy their mechanical blades or they may use too much of the arrow's kinetic energy to cause sufficient damage to the animal to bring it down quickly and humanely. In these cases it may have been better to use a fixed broadhead rather than the malfunctioning mechanical broadhead. The hunter does not know before the arrow strike, however, whether the mechanical or fixed broadhead would have been better for the particular shot. Lack of penetration has been cited as a significant factor in non-lethal shots which are, of course, to be avoided.

Embodiments of the invention address these and other limitations of the prior art.

BRIEF DESCRIPTION OF THE DRAWINGS

FIG. 1 is a side view of an arrow having a capacitor according to embodiments of the invention.

FIG. 2A is a partial side view of an arrow illustrating an arrow in a flight position according to embodiments of the invention.

FIG. 2B is a partial side view of the arrow of FIG. 2A illustrating the arrow in a position that enables an electrical shocking function of the arrow according to embodiments of the invention.

DETAILED DESCRIPTION

Figure 3B:
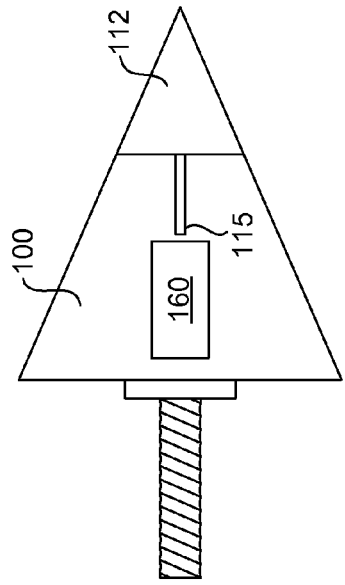
FIG. 3B is a partial side view of the broadhead of FIG. 3A illustrating the broadhead in a position that enables a shocking function of the broadhead according to embodiments of the invention.

Penetration of a projectile such as an arrow into a game animal is dictated by factors such as the amount of kinetic energy retained by the arrow at impact, the time over which such energy is dissipated into the animal, the trajectory of the arrow, and the point of entry into the animal, as well as the sharpness, shape, and orientation of the broadhead blades, for example.

This disclosure generally describes a projectile having a shocking function to shock the target animal as it is being struck by the arrow. The shock can bring down the animal quicker than by using non-shocking arrows. Although herein described as comprising a capacitor, the shocking function according to embodiments of the invention may be created by any appropriate apparatus. For example, energy may be stored in a battery that provides energy to a transformer for sudden discharge to produce the shocking function. Other alternatives exist and are known to those having skill in the art.

In this disclosure the projectile is described with specific references to an arrow, however the projectile may be embodied in other forms, such as a spear, blowdart, crossbow bolts, etc.

FIG. 1 is a side breakaway view of an arrow 10 having a capacitor or other energy storage to implement a shocking function according to embodiments of the invention. The arrow 10 includes a main shaft 20 upon which feathers or fletching 22 are mounted. The fletching 22 stabilizes the arrow 10 during flight. A nock 12 is attached to the main shaft and includes a recess 13 into which the bowstring is received for launching the arrow 10. The nock 12 may also include an LED or other locating signal generating device, such as light or sound that may help the hunter trace the arrow during flight towards the target and also retrieve an arrow that either missed its target or has traveled completely through the target, or is still protruding from the targeted animal which has been struck and is being recovered.

A threaded insert 30 is inserted into the shaft 20 at the end opposite the nock 12. The threaded insert 30 is typically made of metal such as aluminum and is held fast within the shaft 20, by means such as glue (not shown) or held by merely a mechanical friction fit. Typically the threaded insert 30 includes an internally threaded receiver (not shown) into which threads 52 of a broadhead 50 may be received and tightened. The broadhead 50 may be metal and formed by metal injection molding, machining and/or multiple part assemblies.

A capacitor 60 is included within the arrow 10. Although the capacitor 60 is illustrated as being within the shaft 20, the capacitor may be disposed in any convenient location, such as the shaft 20, the threaded insert 30, the broadhead 50, or even in the nock 12. In some embodiments the capacitor 60 is completely contained within the arrow, but in other embodiments the capacitor may extend beyond an outer surface of the arrow 10. Description of the capacitor 60 mechanism is provided below. Many details of the capacitor 60 may be dictated by its particular implementation.

In the most common embodiment, when the arrow 10 is launched from a bow (not shown), the capacitor 60 is in an OFF state, i.e., it is charged and not discharging. Once the arrow 10, or any part of it, strikes a target, the capacitor 60 discharges energy into the animal. This shock stuns the animal as the energy is delivered to the flesh/bone of the target animal as the arrow is penetrating the animal. Vibration motion may also be used by including a vibrator in the arrow which causes a deeper penetration and larger wound channel. The vibration may also help the shaft slide through the wound channel with reduced frictional drag due to the vibrating action. As mentioned above, deeper penetration and a larger wound channel is desirable in hunting because it minimizes the time between arrow penetration and death of the animal. The combination of vibration and shocking an animal may be especially effective at harvesting the animal.

In some embodiments the capacitor 60 is set to discharge at a particular rate, or with a particular signature pattern for maximizing its effectiveness. In some instances the shock is a two-phase shock, a first phase to establish a current path between at least two electrodes on the arrow or broadhead, and a second phase that passes large current between the electrodes. The voltage may be higher in the first phase than in the second, and the amperage may be higher in the second phase than the first.

FIGS. 2A and 2B are partial side views of a broadhead illustrating operation of a switching mechanism for controlling the operation of the capacitor 60 according to embodiments of the invention. In FIG. 2A, the broadhead 50 is separated from being fully seated in the threaded insert 30 by a gap 34. The gap 34 may be caused by a mechanically operated switch, a pin 35 of which is shown, that has physically separated ON and OFF states. Thus, when the gap 34 is present, the switch is in the OFF state, which controls the capacitor 60 to also be in the OFF, or non-discharging, state. Electrodes (not illustrated) may be present on the broadhead 50 or shaft, or anywhere else on the arrow through which an electrical connection may be established with the animal.

With reference to FIG. 2B, after the broadhead 50 of the arrow 10 has struck a target, the switch is mechanically driven to the ON state by the broadhead 50 suddenly striking the target while the remainder of the arrow continues on its path until the gap 30 is eliminated and the switch turned ON, such as by moving its pin 35. The switch then turns ON the capacitor 60 which, as described above, causes the capacitor to discharge its energy into the struck animal. The broadhead 50 may be held in place by small O-rings, snap-rings or other mechanical means.

The switch may also function to turn on the audible and/or visible locating signal in the nock 12 described above with reference to FIG. 1. In other embodiments the locating signal may be switched on by other means, such as an acceleration or physical switch located in the nock 12 itself.

Figure 3D:
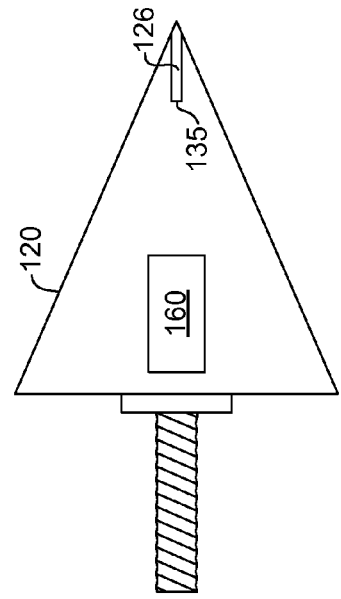
FIG. 3D is a partial side view of the broadhead of FIG. 3C illustrating the broadhead in a position that enables a shocking function of the broadhead according to embodiments of the invention.
Figure 3A:
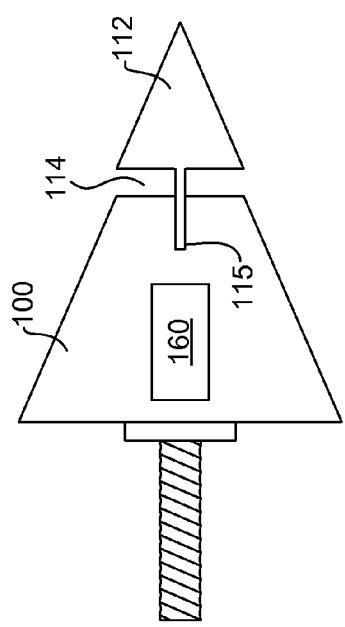
FIG. 3A is a partial side view of a broadhead illustrating the broadhead in a flight position according to embodiments of the invention.

FIG. 3A is a partial side view of a broadhead 100 illustrating the broadhead in an OFF or flight position according to embodiments of the invention. Differently than in the embodiment of FIG. 2A, the embodiment illustrated in FIG. 3A is a self-contained shocking broadhead 100 that includes a capacitor 160 and a switching mechanism 115. The broadhead 100 includes a positionable tip 112 that has two positions. It is illustrated in an open position in FIG. 3A and illustrated in a closed position in FIG. 3B. When the tip 112 is in the open position of FIG. 3A, including a gap 114, the switching mechanism 115 is in an OFF state, and consequently the capacitor 160 is likewise off and not discharging. When the tip 112 is in the closed position of FIG. 3B, and the gap 114 is not present, then the switching mechanism 115 turns to an ON state, and consequently the capacitor is turned ON, and energy stored in the capacitor is transferred to the animal. This increases the stopping or stunning power of the broadhead 100 as described above. The positional tip 112 may be held in place by small O-rings, snap-rings or other mechanical means.

Figure 3C:
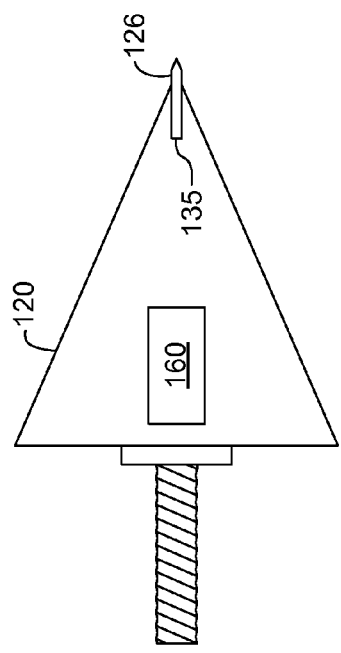
FIG. 3C is a partial side view of another broadhead illustrating the broadhead in a flight position according to embodiments of the invention.

FIGS. 3C and 3D show an embodiment of a broadhead 120 that operates similarly to the broadhead 100 of FIGS. 3A and 3B, except that a switching mechanism 135 is controlled by a position of a relatively small sharp-tipped pin 126 located near the top of the broadhead 120. When the pin 126 is in the open state of FIG. 3C, the capacitor 160 is OFF, and when the pin 126 is in the closed state of FIG. 3D, the capacitor 160 turns ON and discharges. The pin 126 may be held in place by small O-rings, snap-rings or other mechanical means.

Figure 3F:
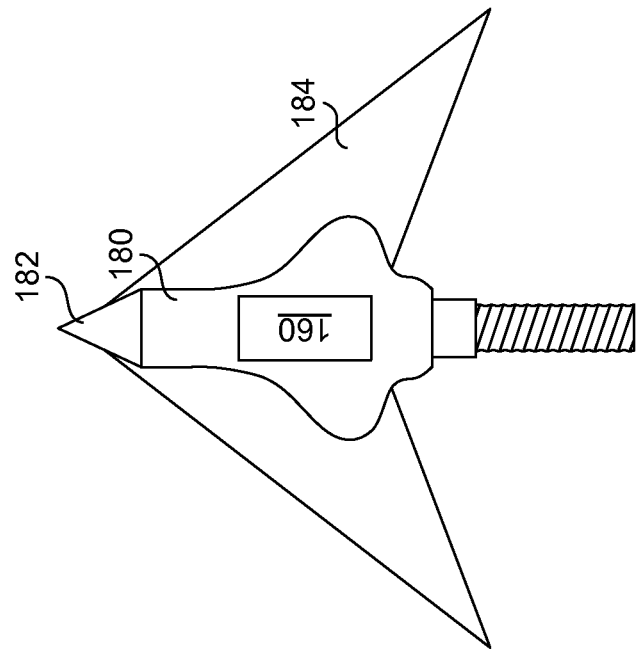
FIG. 3F is a partial side view of the broadhead of FIG. 3E illustrating the broadhead in an open position according to embodiments of the invention.
Figure 3E:
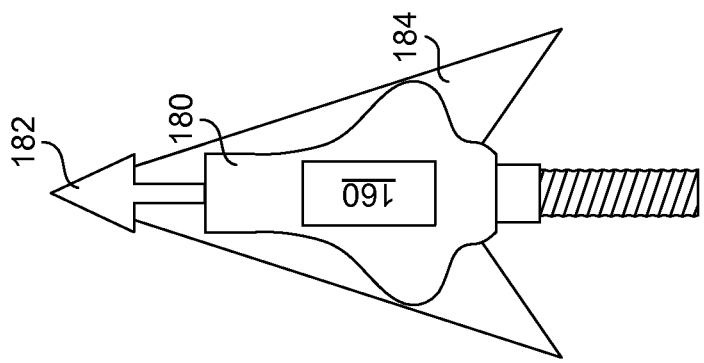
FIG. 3E is a partial side view of a mechanical broadhead illustrating the broadhead in a closed position according to embodiments of the invention.

FIGS. 3E and 3F show an embodiment of a broadhead 180 of the mechanical type that includes two physical positions, a closed position illustrated in FIG. 3E, and an open position illustrated in 3F. While in the closed position of FIG. 3E, blades 184 are held close to the longitudinal axis of the broadhead 180 and a tip 182 is in an extended position. Then, when the arrow strikes its target, the tip 182 of the broadhead 180 moves to the closed position as illustrated in FIG. 3F. Moving the tip 182 to the closed position activates the blades 184 to extend away from the longitudinal axis, and expanding the size of the wound channel created by the broadhead 180. In addition, the tip 182, or other switching mechanism as described herein, controls the operation of the capacitor 160. In this way, the arrow to which the broadhead 180 is attached can travel to its target having its blades 184 in the closed position and the capacitor OFF, then, after striking the target, the blades move to the open position and the capacitor is turned ON. In some embodiments the tip 182 controls operation of both functions, while in other embodiments each function, i.e., extending the blades 184 and operating the capacitor 160 may be controlled by separate switches, and therefore operated independently from one another. As described above, the tip 182 need not be in the shape as illustrated, and may take nearly any form that allows its function.

Figure 3G:
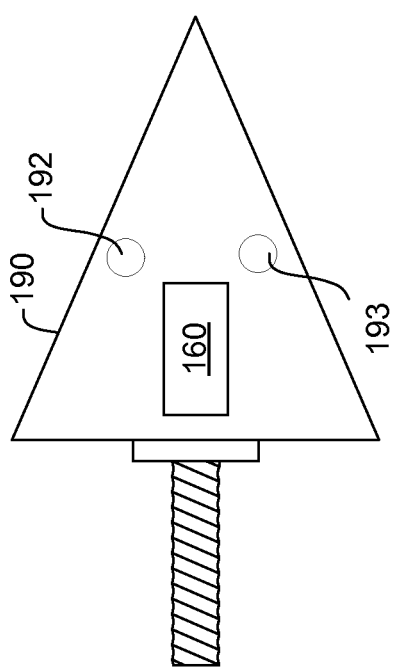
FIG. 3G is a partial side view of a broadhead having electrodes through which a shock may be delivered according to embodiments of the invention.

FIG. 3G illustrates a broadhead 190 that does not include a switch at all, but instead includes two electrodes 192, 193, through which energy may be imparted directly into the animal. In such an embodiment, the capacitor 160 is in a state to be discharged, but is not discharged because there is no current conducting path. Electrodes 192 and 193 are electrically isolated from one another. Then, when the broadhead 190 strikes an animal, the flesh of the animal creates an electrical path between the electrodes 192, 193, causing the capacitor 160 to discharge energy through the animal and causing the shocking function. More particularly, the internal fluids of the animal, which are electrically conductive to some degree, complete the circuit path between electrodes 192 and 193, and allow the capacitor 160 to discharge into the animal.

The shock potential from the capacitor 160 may be at least partially dependent based on the distance the electric charge travels within the animal. In the embodiment illustrated in FIG. 3G, the electrodes are fairly near one another. In other embodiments, the electrodes may be spread farther apart from one another than they are in FIG. 3G. For instance, with reference to FIG. 1, a first electrode may be placed in or on the broadhead 50, while a second electrode is located in or along the main shaft 20. In another embodiment the first electrode may be located at one end of the main shaft 20, while the second is also located on the same shaft, a set distance away. In some embodiments the electrode separation may be between 1 and 20 inches, and preferably between 5 and 15 inches, and most preferably between 8 and 12 inches.

The capacitor 60, 160, includes a charging function so that the capacitor may be electrically charged before the arrow is launched. Such function may include a plug to plug into a wall socket, or a specialized tray into which a capacitor 60, 160 may be placed. In another embodiment a quiver for storing the projectile could include an energy source, such as battery or solar powered source. Then the capacitor 60 could be charged or recharged by inserting the projectile into a receiver within the quiver. The receiver is then electrically connected to the power source. In operation, the capacitor 60, 160 is charged, or the charged capacitor is inserted into the arrow. In some embodiments a safety may be employed so no accidental discharging occurs before desired. In some embodiment the safety may be integrated with a nock switch.

Other power sources could include photovoltaic materials mounted on the arrow shaft or quiver to recharge the capacitor. Other power sources could be within the shaft itself, such as chemically stored power. In some embodiments the energy source or capacitor may take up a majority, most, or all of the interior space of the projectile shaft.

Figure 4:
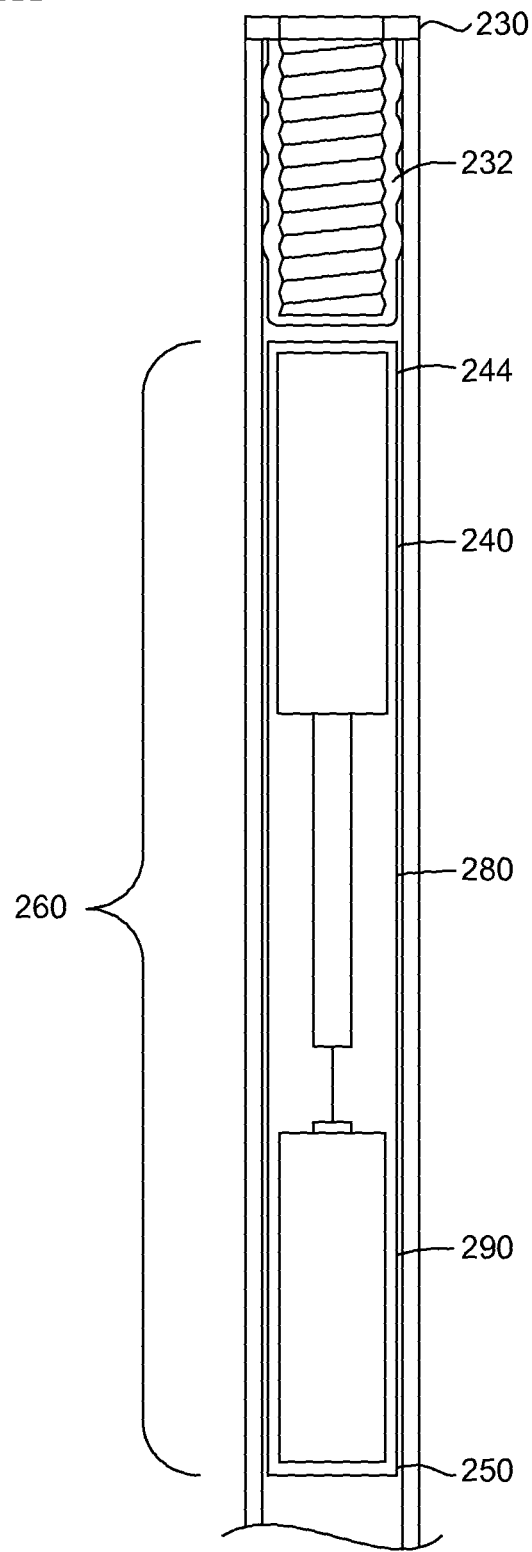
FIG. 4 is a side view of an arrow shaft having a threaded insert therein that includes a capacitor according to embodiments of the invention.

FIG. 4 is a side view of an arrow shaft 200 having a threaded insert 230 that includes a shocking mechanism according to embodiments of the invention. The threaded insert 230 includes a threaded receiver 232 for receiving a standard broadhead (not shown) or even a field point for an arrow or other head. A capacitor 260 may store charge independently, or may be used in conjunction with a battery 290. A switch 280 may be mechanical or based on an accelerometer as described below. A housing 250, such as plastic, nylon, or aluminum, may be used to receive and hold all of the components of the capacitor system 260.

The switch 280 may be a mechanical switch as described above, or may instead be an electrical switch. Some embodiments could use an accelerometer-controlled G switch, which may be able to detect acceleration in one or more than one direction. For example, the switch may be able to detect when the projectile was launched, during acceleration, or may be able to detect when the projectile hits a target, during deceleration. Other switches may be able to detect both acceleration and deceleration. Embodiments could use specifically designed accelerometer switches mounted to a circuit board, for example, to control the switching function.

The switch 280 may also be embodied by other types of switches, such as an impact switch, crush switch, or an electrical switch such as an electrical resistance detector coupled to the broadhead or shaft. In the latter example the electrical resistance would change when the arrow strikes the animal, which, in turn could be used to signal the start of discharging the capacitor. Similarly, the switch 280 could be a capacitive detector triggered by sensing a change in capacitance, or a resistance detector triggered by a sensing a change in resistance, such as when the arrow strikes the animal.

The battery 290 may be sized to fit within the shaft of the arrow, or other power supply appropriately shaped and sized for the implementation. The battery 290 may be of the rechargeable type and structured to recharge through a plug (not shown), or structured to be charged by connecting electrodes (not shown) near the edge of the threaded insert 230 to a power source.

The entirety of the shocking system 260, including the capacitor 240, switch 280, and optional battery 290 may be self-contained within the shaft 200, which may be made of aluminum or carbon, for example. The shocking system 260 may first be placed into the encapsulating housing 250, such as formed of plastic or aluminum, before being inserted into the shaft 200.

Figure 5:
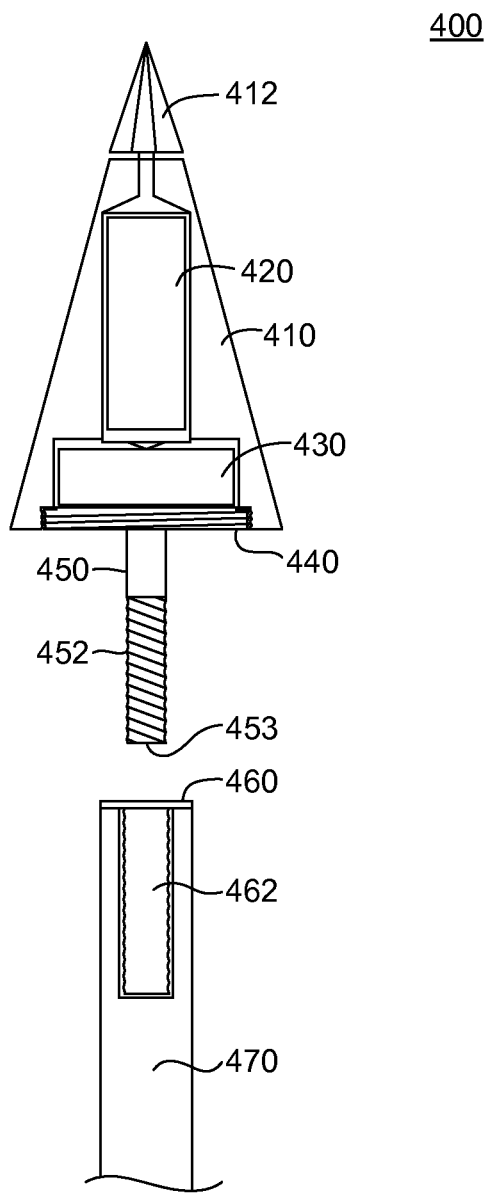
FIG. 5 is a side view of a shocking mechanism for a projectile according to embodiments of the invention.

FIG. 5 is a side view of an example broadhead including a shocking mechanism according to embodiments of the invention. A projectile 400 including a capacitor 420 is illustrated. Differently than in the embodiment illustrated in FIG. 4, the entire shocking system is included in a broadhead 410, which is sized and shaped to be inserted into a standard threaded insert 460 for an arrow shaft 470. In this way hunters may add a shocking system to their existing arrows simply by inserting the broadhead 410.

In more detail, the broadhead 410 includes a capacitor 420, which may also include electronics structured to use the energy stored in the capacitor to shock the animal. A coin cell battery 430 is also wholly contained within the broadhead 410 and provides power to operate the shocking system. Access to the battery 430 is provided by a removable cap 450 that also includes threads 452 to be received by corresponding threads 462 of the threaded insert 460. A receiver 453 in the cap 450 may be shaped to receive a hex/Allen wrench. Thus, to insert or change a battery, the user inserts a hex wrench in the receiver 453 and spins the cap 450 to separate it from the broadhead 410. Then the battery 430 may be inserted into the broadhead 410 and the cap replaced.

A mechanical switch is provided by a separated point 412 of the broadhead 410. As described above, the separated point 412 of the broadhead 410 has two positions, an extended position and a closed position. When the separated point 412 is in the extended position, no power is provided by the capacitor 420 and no shocking is imparted to the animal. When the separated point 412 is in the closed position, such as after the broadhead 410 has struck the target, a mechanical switch is also closed which completes an electrical path across the animal, causing the capacitor to discharge energy into the animal. Broadhead 410 may alternatively include a motion switch as described above. Broadhead 410 may alternatively include no switch at all, and instead include at least two insulated electrodes mounted thereon, or on the arrow itself.

Although described above as the shocking system being wholly contained in the arrow shaft, or wholly contained within the broadhead, a hybrid option is possible that includes various components in various locations. Thus, the energy source could be contained in the nock, shaft, threaded insert, broadhead, or separately attached to the arrow system. The energy source may be shared with other energy-consuming devices in the arrow system, such as lights or audio devices sometimes used to provide tracking of arrow flight path and a retrieving signal to the archer.

The shocking mechanism such as the capacitor could likewise be placed in the nock, shaft, threaded insert, broadhead, or separately attached to the arrow system. Finally, as described above, the switch to initiate the shocking could be located in the nock, shaft, threaded insert, broadhead, or separately attached to the arrow system. The switch may also be located between various components. For example a switch could be integrated into where the nock inserts into the shaft, into where the threaded insert inserts into the shaft, into where the broadhead inserts into the threaded insert, or at the base, midline, or tip of the broadhead. In such embodiments the switch may include a small or weak spring to keep the sections physically separated but that readily collapses when the arrow strikes a target. When the spring deforms, the switch turns on. A stay-on circuit, such as one including a silicon-controlled rectifier, or similar device could be used to keep the capacitor operating even after the spring had returned to its resting position after having struck the target.

In some embodiments the shock may be produced by causing energy to pass between a positive potential at one of the electrodes to a negative potential at another one of the electrodes. Components of the shocking system include one or more conductor, electronic component, or a combination thereof, as may be desirable to condition the electrical power being conducted from an electrical power source to the electrodes. Creating the shocking force may be caused by altering a characteristic of the electrical power, voltage, or current. For example, circuitry could be used to raise the potential available from an electrical power source to raise the potential at one of the electrodes than a potential at another of the electrodes In all of the embodiments an additional lighting circuit could be easily integrated into the shocking circuitry to illuminate when the capacitor was discharging. For example an LED could be mounted with the nock, arrow shaft, threaded insert, or broadhead to illuminate when the capacitor was discharging. The LED could be powered by the capacitor, through appropriate voltage and current limiting circuitry, or through a dedicated circuit, and could be switched on using the same switch that controls the capacitor discharge.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A projectile comprising:
    an elongated shaft;
    a cutting head coupled to the shaft; and
    a capacitor structured to store an electric charge, in which the projectile is structured to discharge the capacitor at a first rate in a first discharge phase and structured to discharge the capacitor at a second rate in a second discharge phase.

2. The projectile according to claim 1, further comprising:
    a switch structured to cause the capacitor to discharge after the projectile strikes a target.

3. The projectile according to claim 2 in which the switch is structured to change from a first state to a second state when the projectile strikes the target.

4. The projectile according to claim 3 in which the switch is a mechanical or acceleration-sensing switch.

5. The projectile according to claim 2 in which the switch is disposed in one of the shaft, a threaded insert, the nock, or the cutting head of the projectile.

6. The projectile according to claim 2 in which the switch is disposed between a nock and the shaft, the shaft and a threaded insert, or between the threaded insert and the cutting head of the projectile.

7. The projectile according to claim 1 in which the projectile is an arrow and in which the cutting head is a broadhead.

8. The projectile according to claim 1 in which the projectile includes first and second capacitor discharge electrodes each coupled to an alternate electrode of the capacitor and structured to discharge the capacitor when an electrical conductor is coupled across the first and second electrodes.

9. A projectile comprising:
an elongated shaft;
a cutting head coupled to the shaft;
a capacitor structured to store an electric charge, charge;
first and second capacitor discharge electrodes each coupled to an alternate electrode of the capacitor and structured to discharge the capacitor when an electrical conductor is coupled across the first and second electrodes,
in which the first capacitor electrode is located in or on the cutting head and in which the second capacitor electrode is located in or on the elongated shaft.

10. The projectile according to claim 9 in which the first electrode and the second electrode are separated by a distance between 1 and 20 inches.

11. An insert for insertion into an arrow shaft of an arrow, the insert comprising a capacitor structured to discharge into a target after the arrow strikes the target and a structure to cause the capacitor to discharge only after the arrow strikes the target, the capacitor structured to store an electric charge, in which the projectile is structured to discharge the capacitor at a first rate in a first discharge phase and structured to discharge the capacitor at a second rate in a second discharge phase.

12. The insert according to claim 11 in which the insert is threaded.

13. The insert according to claim 11 in which the structure is a switch.

* * * * *